United States Patent [19]
Ito

[11] Patent Number: 5,115,476
[45] Date of Patent: May 19, 1992

[54] EDGE FINDING METHOD AND APPARATUS

[75] Inventor: Wataru Ito, Kanagawa, Japan

[73] Assignee: Fuji Photo Film Co., Ltd., Kanagawa, Japan

[21] Appl. No.: 645,526

[22] Filed: Jan. 24, 1991

[30] Foreign Application Priority Data

Jan. 29, 1990 [JP] Japan ................................ 2-18205

[51] Int. Cl.⁵ ............................................. G06K 9/08
[52] U.S. Cl. ................................... 382/22; 382/25; 382/41; 250/327.2
[58] Field of Search ............... 250/327.2 G, 337, 325, 250/326; 382/22, 8, 48, 25, 30, 41, 44, 47; 358/96, 166

[56] References Cited

U.S. PATENT DOCUMENTS

| | | | |
|---|---|---|---|
| 3,585,592 | 6/1971 | Kij | 382/22 |
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/414 |
| 4,327,354 | 4/1982 | Persoon | 382/22 |
| 4,387,428 | 6/1983 | Ishida et al. | 364/414 |
| 4,435,837 | 3/1984 | Abernathy | 382/41 |
| 4,527,060 | 7/1985 | Suzuki et al. | 250/327.2 |
| 4,783,829 | 11/1988 | Miyakawa et al. | 382/22 |
| 4,955,062 | 9/1990 | Terui | 382/48 |
| 4,967,079 | 10/1990 | Shimura | 250/327.2 |

FOREIGN PATENT DOCUMENTS 5611395 2/1981 Japan.

Primary Examiner—Michael Razavi
Attorney, Agent, or Firm—Sughrue, Mion, Zinn Macpeak & Seas

[57] ABSTRACT

In an edge finding method and apparatus, from image signal components representing picture elements belonging to a predetermined region in a radiation image of an object, which predetermined region has a predetermined picture element P0 in the middle, calculations are made to find the moment of the image signal components representing the picture elements, which surround the predetermined picture element P0, with respect to a single predetermined direction on the radiation image. Alternatively, calculations are made to find the moments of the image signal components representing the picture elements, which surround the predetermined picture element P0, with respect to two different predetermined directions on the radiation image. A judgment is then made from the moment, which has been calculated with respect to the single predetermined direction, or from the moments, which have been calculated with respect to the two different predetermined directions, as to whether the predetermined picture element P0 belongs or does not belong to part corresponding to an edge in the radiation image.

14 Claims, 4 Drawing Sheets

EDGE FINDING METHOD AND APPARATUS

BACKGROUND OF THE INVENTION

1. Field of the Invention

This invention relates to an edge finding method wherein, from an image signal made up of a series of image signal components representing a radiation image of an object, judgments are made as to whether predetermined picture elements in the radiation image belong or do not belong to part corresponding to an edge in the radiation image. This invention also relates to an apparatus for carrying out the edge finding method.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like can be reproduced.

Also, when certain kinds of phosphors are exposed to radiation such as X-rays, α-rays, β-rays, γrays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

Recently, in the radiation image recording and reproducing systems which use recording media, such as X-ray film or stimulable phosphor sheets, particularly in such radiation image recording and reproducing systems designed to facilitate medical diagnoses, edges in images are detected from the image signals representing the images. The term "edge" as used herein means part of an image at which the image density (i.e. the value of the image signal) changes sharply. Whether part of an image is to be or is not to be detected as an edge, when how much the image density changes at said part may be determined in accordance with the characteristics of the edge which is to be found.

For example, in the course of recording a radiation image, it is often desirable for portions of the object not related to a diagnosis, or the like, to be prevented from being exposed to radiation. Further, when the object portions not related to a diagnosis, or the like, are exposed to radiation, the radiation is scattered by such portions to the portion that is related to a diagnosis, or the like, and the image quality is adversely affected by the scattered radiation. Therefore, when a radiation image is recorded on the recording medium, an irradiation field stop is often used to limit the irradiation field to an area smaller than the overall recording region of the recording medium so that radiation is irradiated only to that portion of the object, which is to be viewed, and part of the recording medium. In such cases, the shape and location of the irradiation field should be found in order that, as disclosed in, for example, U.S. Pat. No. 4,527,060, image information recorded in the region inside of the irradiation field may be read out under appropriate readout conditions, and/or in order that the image signal representing image information recorded in the region inside of the irradiation field may be processed under appropriate image processing conditions. As proposed in, for example, U.S. Pat. No. 4,967,079, in the course of finding the shape and location of the irradiation field, the edge of the irradiation field is detected by utilizing the difference between the image density in the region inside of the irradiation field and the image density in the region outside of the irradiation field (i.e. the difference between the value of the image signal representing image information recorded in the region inside of the irradiation field and the value of the image signal representing image information recorded in the region outside of the irradiation field).

Also, for example, after an image signal representing an X-ray image of a human body, which image is primarily composed of bone patterns and soft tissue patterns, is detected, it is often desired that the image signal components representing the bone patterns and the image signal components representing each of the soft tissue patterns can be processed under different appropriate image processing conditions. Additionally, in the course of finding specific patterns (e.g. tumor patterns) from an X-ray image having a complicated configuration, it is often desirable for different pattern finding methods to be employed for different regions of the X-ray image. In such cases, it is necessary that boundaries between the bone patterns and the soft tissue patterns and between the plurality of the soft tissue patterns can be found. In the course of finding such boundaries, techniques for detecting edges are often utilized.

In general, differentiation operators are utilized to detect edges in images from image signals representing the images. Such techniques are described in, for example, "Gazo-shori no Kihon-giho" (Basic Techniques for Image Processing), Guide to Techniques Edition, p. 35, by Jun-ichi Hasegawa, Yamato Koshimizu, Akira Nakayama, and Shigeki Yokoi, Gijutsu Hyoron Sha. With the techniques utilizing the differentiation operators, differentiation processing is carried out on image signal components corresponding to positions located along a predetermined direction on an image. Thereafter, a peak value of the absolute values of the differentiated values resulting from the differentiation processing is found.

However, in general, radiation images include very much high-frequency noise caused to occur by, for example, sway of radiation, which is employed during the recording of the radiation images. Therefore, the problems occur in that edges in images cannot be detected accurately when the differentiation operators are employed.

FIGS. 5A, 5B, and 5C are explanatory views showing how problems occur when a differentiation operator is utilized during the detection of an edge in an image.

With reference to FIG. 5A, regions 1, 1, each of which is sandwiched between two, approximately parallel curves, have lower image densities than the surrounding regions (i.e. the values of the image signal components representing the image information recorded in the regions 1, 1 are smaller than the values of the image signal components representing the image information recorded in the surrounding regions). FIG. 5B is a graph showing the levels of the image densities (i.e. the values of the image signal components) corresponding to picture elements in the radiation image, which picture elements are arrayed along the chained line, y, in FIG. 5A. As illustrated in FIG. 5B, the image signal components include very much high-frequency noise. In such cases, if a differentiation operator is merely employed, the problems will occur in that the edges (in this example, the boundaries between the regions 1, 1 and the region 2) cannot be detected accurately. In order for the high-frequency noise to be reduced, the image signal components may be smoothed and then processed with a differentiation operator. However, as shown in FIG. 5C, if the image signal components are smoothed, the edge parts will also be smoothed, and therefore the locations of the edges will become unclear. If the image signal components, which have been smoothed, are processed with a differentiation operator, the problems will occur in that the edges are detected at positions deviated from their correct positions.

As another example of the techniques for detecting an edge in an image, the so-called model fitting technique is known. With the model fitting technique, an appropriate function is determined such that the values of image densities (i.e. the values of the image signal components) can be expressed as the values of the function. An edge in an image is found from the inclination of the function, or the like. Such a model fitting technique is described in, for example, the aforesaid publication "Gazo-shori no Kihon-giho", p. 37. With the model fitting technique, the problems occurs in that edges are detected at positions deviated from their correct positions.

SUMMARY OF THE INVENTION

The primary object of the present invention is to provide an edge finding method wherein, even if a radiation image includes much high frequency noise, an accurate judgment is made as to whether a picture element, which has been designated arbitrarily in the radiation image, belongs or does not belong to part corresponding to an edge in the radiation image, with the judgment being free of adverse effects from the high-frequency noise and free of the problems in that the edge is detected at a position deviated from its correct position.

Another object of the present invention is to provide an apparatus for carrying out the edge finding method.

The present invention provides an edge finding method wherein, from an image signal made up of a series of image signal components representing a radiation image of an object, judgments are made as to whether predetermined picture elements in the radiation image belong or do not belong to part corresponding to an edge in the radiation image, the edge finding method comprising the steps of:

i) from image signal components representing picture elements belonging to a predetermined region in said radiation image, which predetermined region has a predetermined picture element P0 in the middle, calculating the moment of the image signal components representing the picture elements, which surround said predetermined picture element P0, with respect to a single predetermined direction on said radiation image, or calculating the moments of the image signal components representing the picture elements, which surround said predetermined picture element P0, with respect to two different predetermined directions on said radiation image, and ii) from the moment, which has been calculated with respect to the single predetermined direction, or from the moments, which have been calculated with respect to the two different predetermined directions, judging whether said predetermined picture element P0 belongs or does not belong to part corresponding to an edge in said radiation image.

The present invention also provides an edge finding apparatus wherein, from an image signal made up of a series of image signal components representing a radiation image of an object, judgments are made as to whether predetermined picture elements in the radiation image belong or do not belong to part corresponding to an edge in the radiation image, the edge finding apparatus comprising:

i) a moment operation means for, from image signal components representing picture elements belonging to a predetermined region in said radiation image, which predetermined region has a predetermined picture element P0 in the middle, calculating the moment of the image signal components representing the picture elements, which surround said predetermined picture element P0, with respect to a single predetermined direction on said radiation image, or calculating the moments of the image signal components representing the picture elements, which surround said predetermined picture element P0, with respect to two different predetermined directions on said radiation image, and ii) an edge finding means for making a judgment from the moment, which has been calculated with respect to the single predetermined direction, or from the moments, which have been calculated with respect to the two different predetermined directions, as to whether said predetermined picture element P0 belongs or does not belong to part corresponding to an edge in said radiation image.

The moment or moments of image signal components may be of first order or second order.

The moment of image signal components has characteristics such that it takes a small value for a flat part of an image and takes a large value for an edge part in an image. Also, in cases where high-frequency noise occurs irregularly in the image signal, even if the high-frequency noise is large, the moment of image signal components is not substantially affected by high-frequency noise. The present invention is based on the findings of such characteristics of the moment of image signal components.

With the edge finding method and apparatus in accordance with the present invention, calculations are made to find the moment of the image signal components representing the picture elements, which surround a predetermined picture element P0 in a radiation image, with respect to a single predetermined direction on the radiation image. Alternatively, calculations are made to find the moments of the image signal components representing the picture elements, which surround the predetermined picture element P0, with respect to two different predetermined directions on the radiation image. Thereafter, from the moment, which has been calculated with respect to the single predetermined direction, or from the moments, which have been calculated with respect to the two different predetermined directions, a judgment is made as to whether the predetermined picture element P0 belongs or does not belong to part corresponding to an edge in the radiation image. Therefore, an edge in a radiation image can be found accurately without the judgment being adversely affected by high-frequency noise.

In cases where a radiation image is constituted of a very large number of picture elements and a long time is taken for the operations to be carried out for the radiation image, the image signal components representing the picture elements belonging to a predetermined region in the radiation image may be thinned out in an appropriate manner, and only the remaining image signal components may be used in the operations. With the edge finding method and apparatus in accordance with the present invention, even if the image signal components are thinned out and only the remaining image signal components are used in the operations, the accuracy, with which an edge is detected, can be kept high, and problems can be prevented from occurring in that an edge is detected at a position deviated from its correct position. The edge finding method and apparatus in accordance with the present invention are also advantageous in these features over conventional techniques, which utilize differentiation operators.

By way of example, a visible image reproduced from an image signal may be displayed on a CRT display device, and an operator who observes the visible image may designate a predetermined picture element P0. Alternatively, the predetermined picture element P0 may be designated automatically. As another alternative, picture elements in an image may be sequentially selected as the predetermined picture elements, and the edge finding method in accordance with the present invention may be carried out for the predetermined picture elements, which are thus selected sequentially, such that the location of an edge can be detected automatically.

Also, no limitation is imposed on the algorithms employed to make judgments from the moments of image signal components as to whether predetermined picture elements belong or do not belong to part corresponding to an edge in the radiation image. For example, in the course of finding an edge at which the image density changes sharply with respect to a single predetermined direction on the radiation image, calculations may be made to find the moment, A, of the image signal components representing the picture elements, which surround a predetermined picture element P0 in the image, with respect to a single predetermined direction on the radiation image. Thereafter, from the value of the moment A, a judgment may be made as to whether the predetermined picture element P0 belongs or does not belong to part corresponding to an edge in the radiation image. Alternatively, in cases where, for example, it is unclear along which direction on the radiation image the image density changes, calculations may be made to find the moments, A and B, of the image signal components representing the picture elements, which surround the predetermined picture element P0, with respect to two different predetermined directions on the radiation image. Thereafter, from the value of a function of the moments A and B expressed as $$\sqrt{A^2 + B^2}, \tan^{-1}\frac{A}{B}$$

or the like, a judgment may be made as to whether the predetermined picture element P0 belongs or does not belong to part corresponding to an edge in the radiation image.

DESCRIPTION OF THE PREFERRED EMBODIMENTS

The present invention will hereinbelow be described in further detail with reference to the accompanying drawings.

In the embodiments described below, an X-ray image of the chest of a human body is stored on a stimulable phosphor sheet, and an edge in the X-ray image is found.

Figure 1:
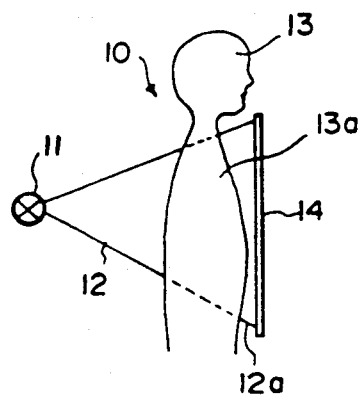
FIG. 1 is a schematic view showing an example of an X-ray image recording apparatus.

FIG. 1 is a schematic view showing an example of an X-ray image recording apparatus.

With reference to FIG. 1, X-rays 12 are produced by an X-ray source 11 of an X-ray image recording apparatus and irradiated to the chest 13a of a human body 13. X-rays 12a, which have passed through the human body 13, impinge upon a stimulable phosphor sheet 4. In this manner, an X-ray image of the chest 13a of the human body 13 is stored on the stimulable phosphor sheet 14.

Figure 2:
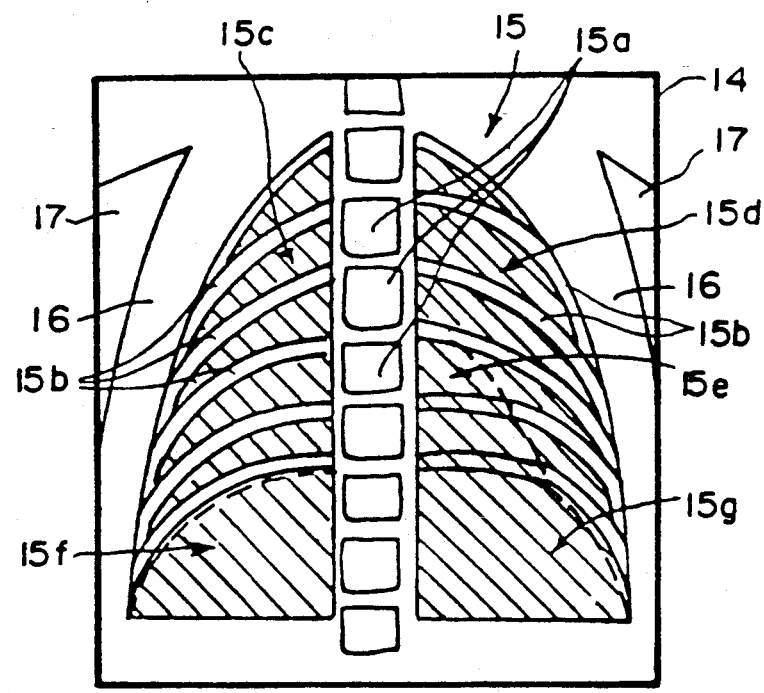
FIG. 2 is an explanatory view showing an example of an X-ray image of the chest, which image has been stored on a stimulable phosphor sheet.

FIG. 2 is an explanatory view showing an example of an X-ray image of the chest, which image has been stored on a stimulable phosphor sheet.

With reference to FIG. 2, the X-ray image stored on a stimulable phosphor sheet 14 comprises a lung region 15 and a skin region 16. The X-ray image also has a background region 17, upon which the X-rays impinged directly without passing through the object 13. The lung region 15 comprises bone patterns and soft tissue patterns. The bone patterns are constituted of spinal column patterns 15a, 15a, . . . and rib patterns 15b, 15b, . . . The soft tissue patterns are constituted of a right lung field region 15c (excluding the rib patterns 15b, 15b, . . . ), a left lung field region 15d (excluding the rib patterns 15b, 15b, . . . ), a heart region 15e, a right diaphragm region 15f, and a left diaphragm region 15g. In this embodiment, the edges of the bone patterns, in particular, the edges of the rib patterns 15b, 15b, . . . , are detected.

Figure 3:
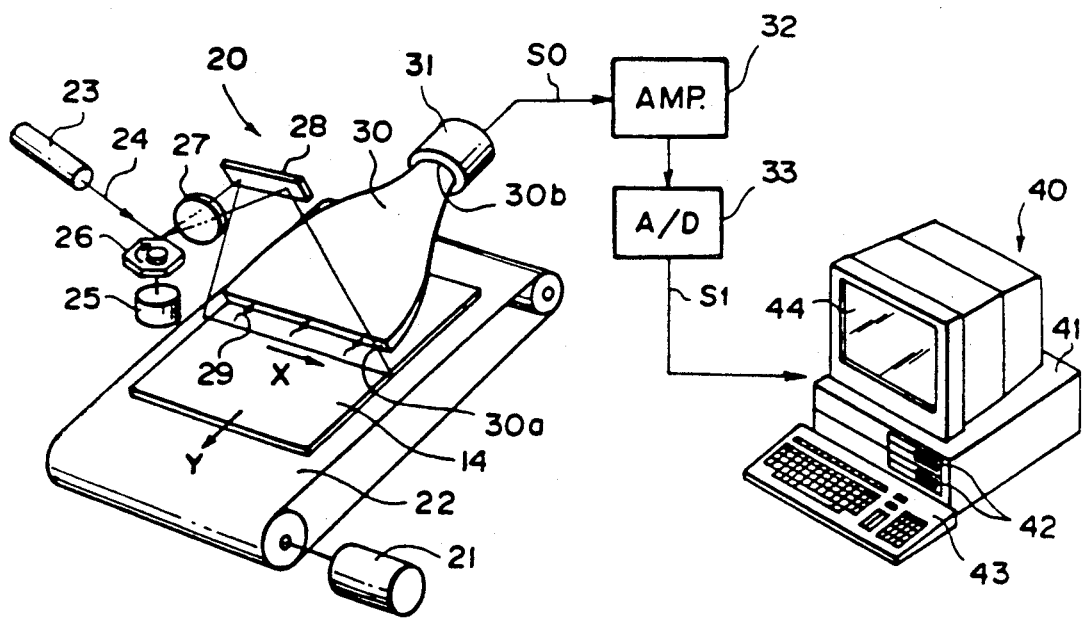
FIG. 3 is a perspective view showing an example of an X-ray image read-out apparatus and a computer system which is provided with an embodiment of the edge finding apparatus in accordance with the present invention.

FIG. 3 is a perspective view showing an example of an X-ray image read-out apparatus and a computer system which is provided with an embodiment of the edge finding apparatus in accordance with the present invention.

With reference to FIG. 3, a stimulable phosphor sheet 14, on which an X-ray image has been stored, is placed at a predetermined position in an X-ray image read-out apparatus 20. The stimulable phosphor sheet 14 is then conveyed in a sub-scanning direction indicated by the arrow Y by a sheet conveyance means 22, which is constituted of an endless belt or the like and which is operated by a motor 21. A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an fθ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material such as an acrylic plate and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal S0 generated by the photomultiplier 31 is logarithmically amplified by a logarithmic amplifier 32, and digitized by an A/D converter 33 into an electric image signal S1.

The image signal S1 is then fed into a computer system 40. The computer system 40 is provided with an embodiment of the edge finding apparatus in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

From the image signal S1, which is made up of a series of image signal components representing the X-ray image and which has been fed into the computer system 40, an edge in the X-ray image is detected.

A spatial-domain filter used to detect an edge is stored in the computer system 40. How the spatial-domain filter works will be described below. In this embodiment, the image signal S1 is processed with the spatial-domain filter, and an edge in the X-ray image is thereby detected.

Figure 4:
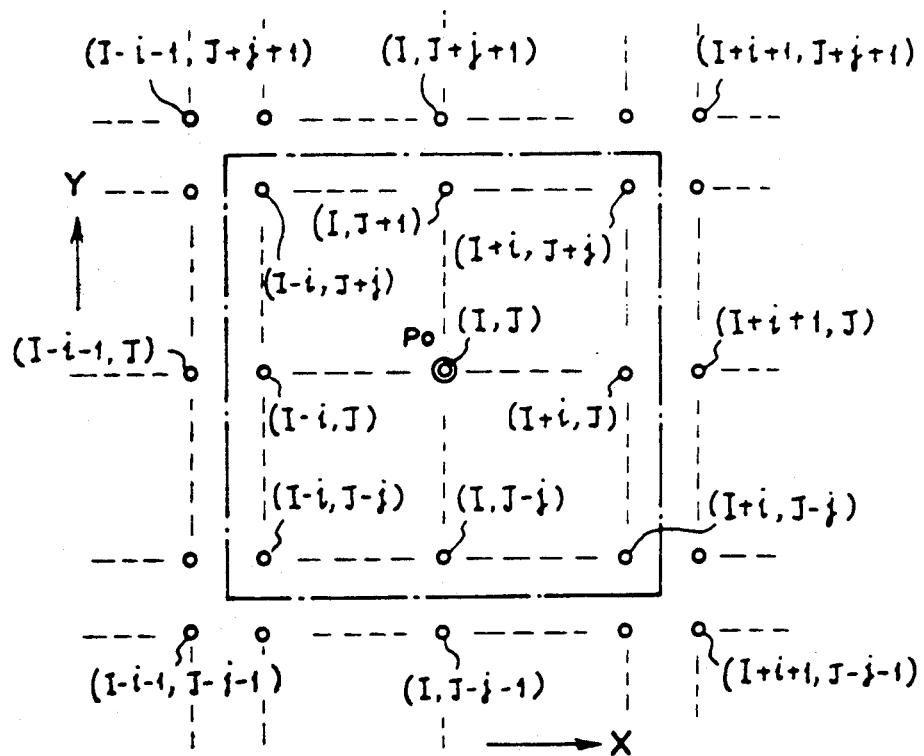
FIG. 4 is a diagram having a predetermined picture element P0 from an X-ray image in the middle and having the picture elements surrounding the predetermined picture element P0, which diagram serves as an aid in explaining how a spatial-domain filter works, the spatial-domain filter being employed to detect an edge in the X-ray image.
Figure 5A:
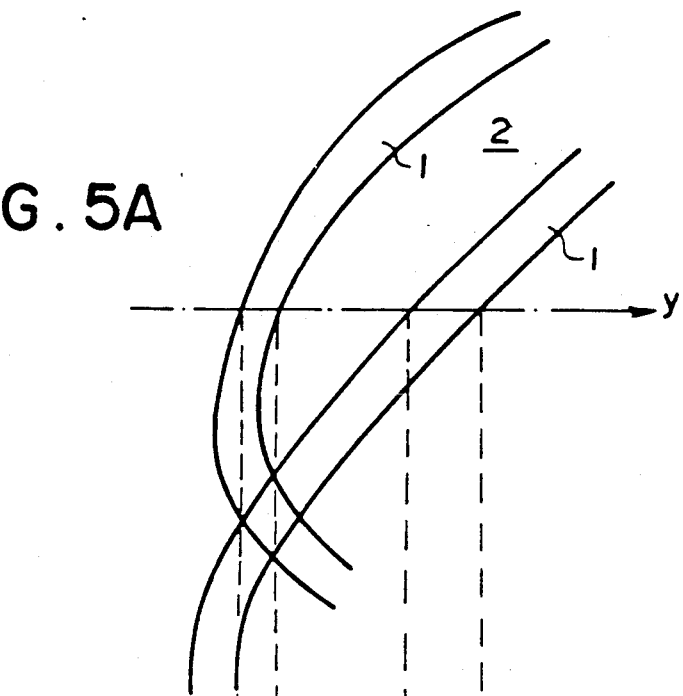
FIGS. 5A, 5B, and 5C are explanatory views showing how problems occur when a differentiation operator is utilized during the detection of an edge in an image.
Figure 5B:
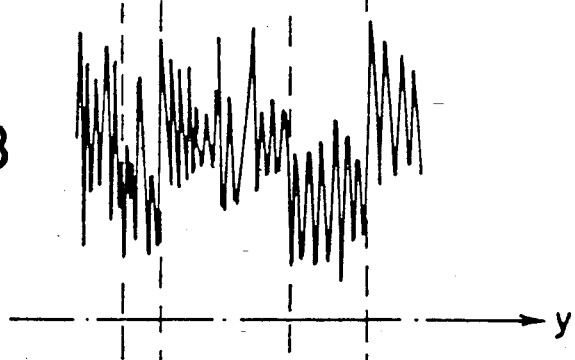
Figure 5C:
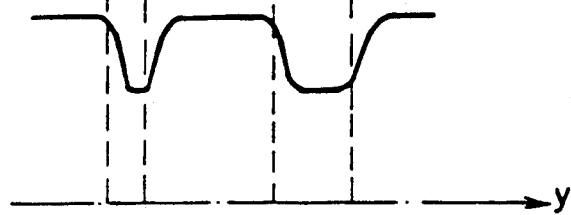

FIG. 4 is a diagram having a predetermined picture element P0 from an X-ray image in the middle and having the picture elements surrounding the predetermined picture element P0, which diagram serves as an aid in explaining how a spatial-domain filter works, the spatial-domain filter being employed to detect an edge in the X-ray image. In FIG. 4, the horizontal direction corresponds to the main scanning direction indicated by the arrow X in FIG. 3. The vertical direction corresponds to the sub-scanning direction indicated by the arrow Y in FIG. 3. The predetermined picture element P0 is marked with a double circle and has the coordinates (I,J). The picture elements surrounding the predetermined picture element P0 are marked with a circle and have the co-ordinates, which are indicated at the corresponding circles. The values of the image signal components representing the picture elements having the respective co-ordinates are herein represented by P(l,m), where l, m = 1, 2, . . .

From the image signal components, which represent the picture elements belonging to the region surrounded by the chained line in FIG. 4, the moment A of first order with respect to the direction indicated by the arrow X and the moment B of first order with respect to the direction indicated by the arrow Y are calculated with the formulas $$A = \frac{\sum_{l=-i}^{i} \sum_{m=-j}^{j} P(I-l, J-m) \cdot i}{\sum_{l=-i}^{i} \sum_{m=-j}^{j} P(I-l, J-m) \cdot j} \quad (1)$$

$$B = \frac{\sum_{l=-i}^{i} \sum_{m=-j}^{j} P(I-l, J-m) \cdot j}{\sum_{l=-i}^{i} \sum_{m=-j}^{j} P(I-l, J-m)} \quad (2)$$

The moment A of first order takes a peak value for a picture element belonging to part corresponding to an edge, at which the image density (i.e. the value of the image signal) changes sharply with respect to the direction indicated by the arrow X (i.e. the main scanning direction). Also, the moment B of first order takes a peak value for a picture element belonging to part corresponding to an edge, at which the image density (i.e. the value of the image signal) changes sharply with respect to the direction indicated by the arrow Y (i.e. the sub-scanning direction). In this embodiment, the combination of the hardware and software functions for calculating the moments A and B of first order with Formulas (1) and (2) constitutes an example of the moment operation means of the edge finding method in accordance with the present invention.

Thereafter, such that an edge can be detected even if the edge extends in any direction on the X-ray image (or even if the image density, i.e. the value of the image signal, changes with respect to any direction on the X-ray image), a characteristic value C1 is calculated. The characteristic value C1 is expressed as $$C1 = \sqrt{A^2 + B^2} \quad (3)$$

In this embodiment, the calculations with Formulas (1), (2), and (3) are repeated for all image signal components representing the X-ray image. The characteristic value among the characteristic values C1, C1, ..., which exceeds a predetermined threshold value Th and constitutes a peak, is found, and the position on the X-ray image associated with the characteristic value thus found is detected as belonging to part corresponding to an edge in the X-ray image. In this embodiment, the combination of the hardware and software functions for calculating the characteristic value C1 with Formula (3) and finding an edge in the X-ray image constitutes an example of the edge finding means of the edge finding method in accordance with the present invention.

In the manner described above, the edges of the rib patterns 15b, 15b, ..., are detected. Thereafter, the image signal components, which represent the bone patterns (i.e. the spinal column patterns 15a, 15a, ... and the rib patterns 15b, 15b, ... ), and the image signal components, which represent the soft tissue patterns, are processed in different appropriate manners. From the image processing, an image signal S2 representing an X-ray image is generated, which image has good image quality and can serve as an effective tool in, particularly, the efficient and accurate diagnosis of an illness. The image signal S2 is fed into an image reproducing apparatus (not shown), which reproduces a visible image having good image quality from the image signal S2.

As illustrated in FIG. 2, the directions, along which the rib patterns 15b, 15b, ..., extend, are approximately the same in the respective regions in the X-ray image. Therefore, for each of the regions in the X-ray image, the moment of first order may be calculated from the image signal components representing the picture elements with respect to the direction on the X-ray image, which direction is considered as being approximately normal to the directions along which the rib patterns 15b, 15b, ..., extend. Thereafter, an edge in the X-ray image may be found from the moment of first order thus calculated. Alternatively, either one of the moments A and B of first order, whichever has been calculated from the image signal components representing the picture elements with respect to a direction on the X-ray image, which direction is closer to the direction normal to the directions along which the rib patterns 15b, 15b, ..., extend, may be employed independently for each of the regions in the X-ray image. As another alternative, a characteristic value C2 may be employed, which is expressed as $$C2 = W1A + W2B \quad (4)$$

where W1 and W2 represent weight factors. As a further alternative, a characteristic value C3 may be employed, which is expressed as $$C3 = \tan^{-1}\frac{B}{A} \quad (5)$$

In this manner, one of various characteristic values may be employed in accordance with, for example, which boundary in the image is to be detected as an edge and in which direction the edge to be detected is assumed to extend.

Also, in lieu of the moments A and B of first order, moments A' and B' of second order may be employed, which are calculated with the formulas $$A' = \frac{\sum_{l=-i}^{i} \sum_{m=-j}^{j} P(I-l, J-m) \cdot i^2}{\sum_{l=-i}^{i} \sum_{m=-j}^{j} P(I-l, J-m)} \quad (6)$$

$$B' = \frac{\sum_{l=-i}^{i} \sum_{m=-j}^{j} P(I-l, J-m) \cdot j^2}{\sum_{l=-i}^{i} \sum_{m=-j}^{j} P(I-l, J-m)} \quad (7)$$

Alternatively, moments of higher order may be employed.

In the embodiment described above, edges of the rib patterns 15b, 15b, ... are detected. Alternatively, for example, from the X-ray image shown in FIG. 2, the boundary of the heart region 15e may be detected as an edge in order for the heart region 15e to be discriminated from the other regions. The edge finding method and apparatus in accordance with the present invention are not limited to the detection of an edge in the X-ray image of the lungs, but is applicable widely when edges in various types of radiation images are to be found.

Also, no limitation is imposed on the purposes for which the edges are found. For example, edges may be detected in order for a certain region in an image to be detected and reproduced selectively. Alternatively, edges may be detected such that image processing may be carried out in different appropriate manners for different regions in an image. As another alternative, edges may be detected when only the image signal components corresponding to a specific region in an image are to be processed in order for a tumor pattern, or the like, to be detected.

In the aforesaid embodiment, an edge is detected by processing the image signal components representing the picture elements in the X-ray image. However, the edge finding method and apparatus in accordance with the present invention are not limited to the processing of the image signal components. For example, an operator may designate a predetermined picture element P0 in an image, and a judgment may be made as to whether the designated picture element belongs or does not belong to part corresponding to an edge in the image.

I claim:

1. An edge finding method wherein, from an image signal made up of a series of image signal components representing a radiation image of an object, judgements are made as to whether predetermined picture elements in the radiation image belong or do not belong to a part corresponding to an edge in the radiation image, the edge finding method comprising the steps of:
   i) from image signal components representing picture elements belonging to a plurality of predetermined regions in said radiation image, each of said plurality of predetermined regions having a predetermined picture element P0 in the middle, calculating for each predetermined region moments of the image signal components representing the picture elements, which surround said predetermined picture element P0, with respect to a single predetermined direction on said radiation image, or calculating for each predetermined region moments of the image signal components representing the picture elements, which surround said predetermined picture element P0, with respect to two different predetermined directions on said radiation image, and
   ii) calculating characteristic values based upon the moments, which have been calculated with respect to the single predetermined direction, or from the moments, which have been calculated with respect to the two different predetermined directions;
   iii) determining which one of the characteristic values exceed a predetermined threshold value and judging whether said predetermined picture element P0 belongs or does not belong to a part corresponding to an edge in said radiation image.

2. A method as defined in claim 1 wherein said moments are of first order.

3. A method as defined in claim 1 wherein said moments are of second order.

4. A method as defined in claim 1 wherein said radiation image of the object has been stored on a stimulable phosphor sheet.

5. A method as defined in claim 4 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

6. A method as defined in claim 5 wherein said stimulating rays are a laser beam.

7. A method as defined in claim 1 wherein said radiation image of the object has been recorded on photographic film.

8. An edge finding apparatus wherein, from an image signal made up of a series of image signal components representing a radiation image of an object, judgements are made as to whether predetermined picture elements in the radiation image belong or do not belong to a part corresponding to an edge in the radiation image, the edge finding apparatus comprising:
   a moment operation means for, from image signal components representing picture elements belonging to a plurality of predetermined regions in said radiation image, each of said plurality of predetermined regions, having a predetermined picture element P0 in the middle, calculating for each predetermined region moments of the image signal components representing the picture elements, which surround said predetermined picture element P0, with respect to a single predetermined direction on said radiation image, or calculating for each predetermined region moments of the image signal components representing the picture elements, which surround said predetermined picture element P0, with respect to two different predetermined directions on said radiation image;
   means for calculating characteristic values based upon the moments which have been calculated with respect to the single predetermined direction, or from the moments which have been calculated with respect to the two different predetermined directions; and
   an edge finding means for determining which one of said characteristic values exceeds a predetermined threshold so as to determine whether said predetermined picture element P0 belongs or does not belong to a part corresponding to an edge in said radiation image.

9. An apparatus as defined in claim 8 wherein said moments are of first order.

10. An apparatus as defined in claim 8 wherein said moments are of second order.

11. An apparatus as defined in claim 8 wherein said radiation image of the object has been stored on a stimulable phosphor sheet.

12. An apparatus as defined in claim 11 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

13. An apparatus as defined in claim 12 wherein said stimulating rays are a laser beam.

14. An apparatus as defined in claim 8 wherein said radiation image of the object has been recorded on photographic film.

* * * * *